(12) United States Patent
ud Din et al.

(10) Patent No.: US 12,407,372 B2
(45) Date of Patent: Sep. 2, 2025

(54) TRANSCEIVER SWITCH CIRCUITRY

(71) Applicant: Telefonaktiebolaget LM Ericsson (publ), Stockholm (SE)

(72) Inventors: Imad ud Din, Flyinge (SE); Christian Elgaard, Lund (SE); Stefan Andersson, Flyinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 298 days.

(21) Appl. No.: 18/245,985

(22) PCT Filed: Sep. 30, 2020

(86) PCT No.: PCT/EP2020/077432
§ 371 (c)(1),
(2) Date: Mar. 20, 2023

(87) PCT Pub. No.: WO2022/069038
PCT Pub. Date: Apr. 7, 2022

(65) Prior Publication Data
US 2023/0353187 A1    Nov. 2, 2023

(51) Int. Cl.
*H04B 1/44*  (2006.01)
*H04B 1/00*  (2006.01)
*H04B 1/54*  (2006.01)

(52) U.S. Cl.
CPC ............ *H04B 1/44* (2013.01); *H04B 1/0053* (2013.01); *H04B 1/54* (2013.01)

(58) Field of Classification Search
CPC . H04B 1/44; H04B 1/006; H04B 1/02; H04B 1/04; H04B 2001/0408; H04B 1/06;
(Continued)

(56) References Cited

U.S. PATENT DOCUMENTS 9,369,173 B1 *  6/2016  Yoon .................. H04B 1/44
10,389,358 B1    8/2019  Wang et al.
(Continued)

FOREIGN PATENT DOCUMENTS

CN    108566188 A    9/2018
JP    2011010137 A    1/2011
(Continued)

OTHER PUBLICATIONS

International Search Report and Written Opinion dated Jun. 7, 2021 for International Application No. PCT/EP2020/077431 filed Sep. 30, 2020, consisting of 8 pages.
(Continued)

*Primary Examiner* — Tuan Pham
(74) *Attorney, Agent, or Firm* — Weisberg I.P. Law, P.A.

(57) ABSTRACT

Transceiver switch circuitry having an antenna port, a receiver port and two transmitter ports. The transceiver switch circuitry is configured to be operable in a reception mode to allow reception signals at the antenna port to be forwarded to the receiver port, and in a transmission mode to allow transmission signals, having a center frequency with a wavelength $\lambda$, at the first transmitter port and the second transmitter port to be forwarded to the antenna port for transmission. The transceiver switch circuitry includes a receive arrangement comprising having a receiver $\lambda/4$ impedance transformer and a receiver switch circuitry configured to ground the first $\lambda/4$ impedance transformer at the receiver port in the transmission mode; and a transmit arrangement having three transmitter impedance transformers and a first and second transmitter switch circuitry configured to virtually ground a second side of the first $\lambda/4$ impedance transformer in the reception mode.

20 Claims, 10 Drawing Sheets

(58) Field of Classification Search
CPC ... H04B 1/16; H04B 1/54; H04B 1/40; H04B 1/0053
See application file for complete search history.

(56) References Cited

U.S. PATENT DOCUMENTS

| | | | |
|---|---|---|---|
| 10,873,138 B2 * | 12/2020 | Perumana | H01Q 3/24 |
| 11,539,333 B2 * | 12/2022 | Yang | H04B 1/525 |
| 2004/0185818 A1 | 9/2004 | Ha et al. | |
| 2005/0255810 A1 | 11/2005 | Monroe | |
| 2006/0094357 A1 | 5/2006 | McCorkle | |
| 2007/0232241 A1 | 10/2007 | Carley et al. | |
| 2007/0274238 A1 | 11/2007 | Kim | |
| 2007/0279099 A1 | 12/2007 | Goddard et al. | |
| 2008/0310382 A1 | 12/2008 | Nakagawa et al. | |
| 2011/0143690 A1 | 6/2011 | Jerng et al. | |
| 2013/0331043 A1 | 12/2013 | Perumana et al. | |
| 2014/0120968 A1 | 5/2014 | Mahmood | |
| 2014/0124908 A1 | 5/2014 | Sameshima et al. | |
| 2016/0028432 A1 | 1/2016 | Zhang et al. | |
| 2019/0158047 A1 | 5/2019 | Watkins | |
| 2020/0083924 A1 | 3/2020 | Callendar et al. | |
| 2020/0274575 A1 | 8/2020 | Yang et al. | |

FOREIGN PATENT DOCUMENTS

| | | |
|---|---|---|
| JP | 2011211589 A | 10/2011 |
| WO | 2018077409 A1 | 5/2018 |
| WO | 2019057299 A1 | 3/2019 |
| WO | 2021259495 A1 | 12/2021 |

OTHER PUBLICATIONS

International Search Report and Written Opinion dated Jun. 18, 2021 for International Application No. PCT/EP2020/077432 filed Sep. 30, 2020, consisting of 8 pages.

International Search Report and Written Opinion dated Jul. 8, 2021 for International Application No. PCT/EP2020/083695 filed Nov. 27, 2020, consisting of 10 pages.

Non-Final Office Action issued in U.S. Appl. No. 18/245,964, dated May 19, 2025, consisting of 42 pages.

Notice of Allowance dated Jun. 18, 2025 for U.S. Appl. No. 18/252,617, filed May 11, 2023, consisting of 27 pages.

* cited by examiner

TRANSCEIVER SWITCH CIRCUITRY

CROSS-REFERENCE TO RELATED APPLICATION

This application is a Submission Under 35 U.S.C. § 371 for U.S. National Stage Patent Application of International Application Number: PCT/EP2020/077432, filed Sep. 30, 2020 entitled "A TRANSCEIVER SWITCH CIRCUITRY," the entirety of which is incorporated herein by reference.

TECHNICAL FIELD

The present disclosure relates to the field of transceiver switch circuitry, especially for transceivers for wireless communication and nodes using such transceivers.

BACKGROUND

Tx/Rx Isolators (or transceiver, TRX, Switches) are used in communications transceivers to protect the receiver circuitry from the power amplifier output signal. If the Tx signal reaches the Rx port without attenuation, the high amplitude may destroy the sensitive receiver inputs. The following describes the basic functions of a Tx/Rx isolator.

FIGS. 1a and 1b illustrate a transceiver switch 10, which includes a transmitter circuitry 12, a receiver circuitry 13, an antenna 11, a transmitter switch 5 and a receiver switch 6.

FIG. 1a shows a transceiver switch 10 in transmission, Tx, mode. The transmitter switch 5 is in an ON state or is closed so it presents a low impedance and the transmission signal generated in the transmitter circuitry 12 gets through to the antenna 11, as indicated by the dashed arrow 2. However, the receiver switch 6 is in an OFF state or is open and presents a large impedance compared to the receiver input impedance. As a result, most of the transmitter voltage swing drops across the open receiver switch 6 instead of the receiver input thus protecting the input of the receiver circuitry 13 from damage.

FIG. 1b shows the transceiver switch 10 in reception, Rx, mode. The transmitter switch 5 is in an OFF state in order to stop the received antenna signal from flowing to the transmitter output at the transmitter circuitry 12 (and increasing the Rx insertion loss). The receiver switch 6 is in ON state, presenting a low impedance to the signal from the antenna 11 as indicated by the dashed arrow 3 to the receiver circuitry 13.

Many radio systems, such as 4G and 5G, use modulated signals with high peak to average ratio, PAR, which is a cause of low overall efficiency at average (or back-off) output power. One of the main blocks responsible for this low efficiency at back-off is the power amplifier. One way of improving this, as exploited by the Doherty PA structure, is to use load modulation to achieve a higher power added efficiency, PAE, at average output power levels.

FIG. 2a shows one possible implementation of a Doherty amplifier 20. The Doherty amplifier 20 as seen in FIG. 2a comprises a main/first amplifier 21 and an auxiliary/second amplifier 22. The main amplifier 21 drives a transmission line 23 with a phase of 0°. The auxiliary amplifier 22 is OFF until the input signal strength reaches a certain threshold, so that the main amplifier 21 is solely responsible for driving the transmission line 23 with characteristic impedance $Z_1$.

As the input signal strength rises above the threshold, the auxiliary amplifier 22 starts driving the node, marked with "a", between the transmission line 23 and the antenna 11 with a phase of 90° relative to the main amplifier 21. The output impedance of the main amplifier 21 is reduced due to load modulation as the signal amplitude increases, so the power amplifier can deliver high output power to the antenna 11.

Typically, the value of the transmission line impedance $Z_1$, as shown in FIG. 2a, is higher than 50Ω for the load modulation to work in node "a" while matching to the antenna impedance, which typically is 50Ω. High voltage levels exist at node "a" (which is the same as node "b" in FIG. 2a).

Devices in modern Complementary Metal Oxide Semiconductor, CMOS, processes are unable to sustain large voltages. If high power levels are expected to be delivered by a power amplifier implemented in such a technology, it may become necessary to reduce the load impedance to limit the voltage levels at peak output power.

FIG. 2b shows an implementation of a Doherty amplifier 25. In the configuration of the Doherty amplifier 25 shown in FIG. 2b, a quarter wavelength transmission line 26 shown as $Z_2$ is added to the Doherty amplifier 20 of FIG. 2a in order to achieve a degree of freedom, which matches the impedance in node "a" to the antenna impedance.

This makes it possible to choose impedance value in node "a".

In radio frequency, RF, transceivers, both the transmission and reception circuits are connected to the antenna. In modern CMOS technologies, the thin oxide gates can typically tolerate only a limited voltage, meaning that high voltage levels at the RF input can damage the Low Noise Amplifier, LNA, of the receiver. In time division duplexing, TDD, systems, the PA and the LNA are typically connected to a transceiver (or TRX) switch that directs the signal either from the PA to antenna in Tx mode or from antenna to LNA in Rx mode, as illustrated in FIGS. 1a and 1b. Since high voltage levels exist at the antenna node, the switch must isolate the LNA from the antenna during TX mode, such that these high signal levels do not reach the LNA input.

In order to work properly as part of a 5G mm-wave transceiver, a transceiver must have low Tx insertion loss, low Rx insertion loss, high linearity and, preferably, enough bandwidth to cover a whole band of operation. A high Tx insertion loss results in loss of output power of the transmitter while a high Rx insertion loss results in loss of sensitivity for the receiver.

Non-linearity of the TRX switch can result in poor Adjacent Channel Leakage Ratio, ACLR, at the antenna, compromising the error vector magnitude, EVM, and thus the performance of the transmitter. CMOS switches in current technologies are non-linear when operating with large voltage levels. The TRX switch should be much more linear than the PA in order not to be the dominant source of non-linearity in the Tx mode.

In distributed amplifiers, such as Doherty Amplifiers, typically, low output impedance (due to, for example, load modulation) is used to provide high power output while remaining within the safe voltage operating limits dictated by technology. A switch with integrated impedance matching of a low output impedance PA to a 50 Ohm antenna is desirable.

Traditionally, a switch is a separate block that causes some attenuation of the wanted signal due to its insertion loss. This loss typically comes from the internal components in the switch structure, for example, lossy transmission line segments or the CMOS devices used a switch. During Tx operation, any loss in the Tx to antenna path will affect the efficiency of the transmitter.

External components have traditionally been used for implementing the TRX functionality. However, this may not be feasible for mm-wave solutions due to package losses and high restrictions on board area when the solution should be used in an antenna array.

Solutions with integrated transceiver switch circuitry rely on CMOS switches to provide the isolation and handle the high Tx swing. Due to high voltage swing at the Tx output, multiple switches usually must be stacked in order to avoid breakdown. However, many stacked switches may result in high insertion loss during the Rx operation. A small number of switches, on the other hand, may result in a solution that is quite non-linear in the Tx mode. Normally integrated switches are narrow-band and have limited filtering of the spurious emissions from the PA.

SUMMARY

An object of the present disclosure is to provide a transceiver switch circuitry which seeks to mitigate, alleviate, or eliminate one or more of the above-identified deficiencies in the art and disadvantages singly or in any combination and to provide an improved transceiver switch with low insertion loss for distributed power amplifiers.

This object is obtained by a new transceiver switch circuitry implemented with traditional Power Amplifiers, PA, (e.g. Doherty Amplifiers (DPA)) along with other components. Since no new components are added to the existing DPA structure, no additional insertion loss is introduced due to the Tx-to-Antenna path of the transceiver switch circuitry.

According to an aspect, a transceiver switch circuitry is provided. The transceiver switch circuitry comprises an antenna port connectable to an antenna circuitry, a receiver port connectable to a receiver circuitry, a first amplifier port connectable to a first amplifier circuitry, and at least one second amplifier port connectable to at least one second amplifier circuitry. The transceiver switch circuitry is configured to be operable in a reception mode to allow reception signals at the antenna port to be forwarded to the receiver port. Further, the transceiver switch circuitry is configured to be operable in a transmission mode to allow transmission of transmission signal at the first amplifier port and the at least one second amplifier port to be forwarded to the antenna port for transmission. The transmission signals having a transmission center frequency with a wavelength, $\lambda$, and the reception signals having a reception center frequency within ten percent of the transmission center frequency. The transceiver switch circuitry further comprises a receive arrangement connected between the antenna port and the receiver port, the receive arrangement comprises a receiver quarter wavelength, $\lambda/4$, impedance transformer and a receiver switch circuitry configured to ground the receiver quarter wavelength, $\lambda/4$, impedance transformer at the receiver port in the transmission mode. The transceiver switch circuitry further comprises a transmit arrangement connected between the antenna port, the first amplifier port and the at least one second amplifier port. The transmit arrangement comprises a first, a second and a third transmitter quarter wavelength, $\lambda/4$, impedance transformer. The first transmitter quarter wavelength, $\lambda/4$, impedance transformer having a first side connected to the antenna port and a second side connected to a first side of the second transmitter quarter wavelength, $\lambda/4$, impedance transformer and the third transmitter quarter wavelength, $\lambda/4$, impedance transformer having a first side connected to a second side of the second transmitter quarter wavelength, $\lambda/4$, impedance transformer and a second side connected to a DC supply voltage, $V_{dd}$.

The first amplifier port is connected via a first transmitter switch circuitry to the second side of the second transmitter quarter wavelength, $\lambda/4$, impedance transformer and the at least one second amplifier port is connected via a second transmitter switch circuitry to the second side of the first transmitter quarter wavelength, $\lambda/4$, impedance transformer. The first and second transmitter switch circuitry are configured to disconnect the first amplifier port and at least one second amplifier port from the respective transmitter quarter wavelength, $\lambda/4$, impedance transformer in the reception mode.

According to another aspect, a transceiver for wireless communication is provided. The transceiver for wireless communication comprises a transceiver switch circuitry, as described above, being connectable to an antenna via an antenna port for transmitting transmission signals during transmission mode, and receiving reception signals during reception mode. The transceiver comprises a first amplifier connected to a first amplifier port of the transceiver switch circuitry and a second amplifier connected to a second amplifier port of the transceiver switch circuitry, the first amplifier and second amplifier being configured to generate transmission signals. The transceiver further comprises a receiver connected to a reception port of the transceiver switch circuitry and being configured to receive reception signals.

Advantageously, the proposed transceiver switch circuitry re-uses the transmission lines and the amplifiers of the DPA such that it avoids any additional loss due to the transmitter and receiver switch in TX mode. This causes improvement in the efficiency and power output of power amplifier (PA) during TX operation. Also, in the transceiver, the transmission lines needed to implement the Doherty PA are concurrently used to also implement the TX to antenna path of the transceiver switch circuitry. The transceiver switch circuitry is thus "absorbed" into a Doherty structure. Since, transceiver switch circuitry is linear and since no new active device is introduced in the transmitter, linearity in the Tx mode is only affected by how well the Rx is isolated from the Tx.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 3b illustrates a lumped component implementation of a quarter wavelength, $\lambda/4$, impedance transformer in the transmitter circuitry of FIG. 3a;

FIG. 4 illustrates a transceiver switch circuitry with the transmitter circuitry of FIG. 3a;

DETAILED DESCRIPTION

Figure 1A:
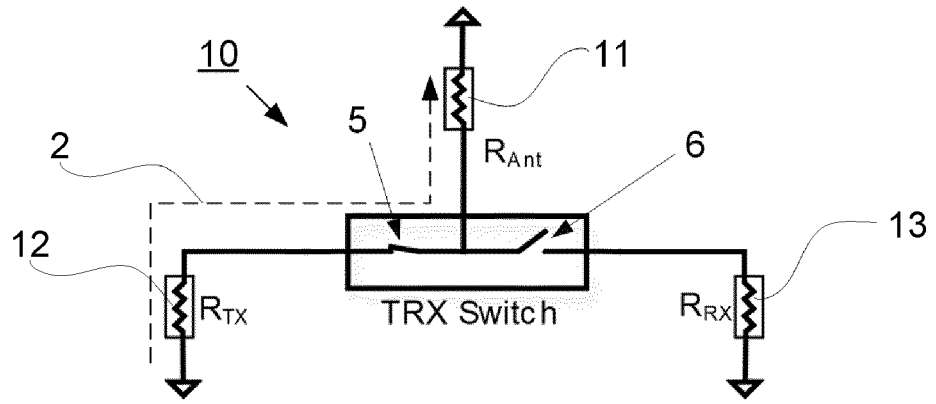
FIGS. 1a and 1b illustrate the functionality in a prior art transceiver switch.

Aspects of the present disclosure will be described more fully hereinafter with reference to the accompanying drawings. The apparatus disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Some of the example embodiments presented herein are directed towards a transceiver switch. As part of the development of the example embodiments presented herein, a problem will first be identified and discussed.

Figure 1B:
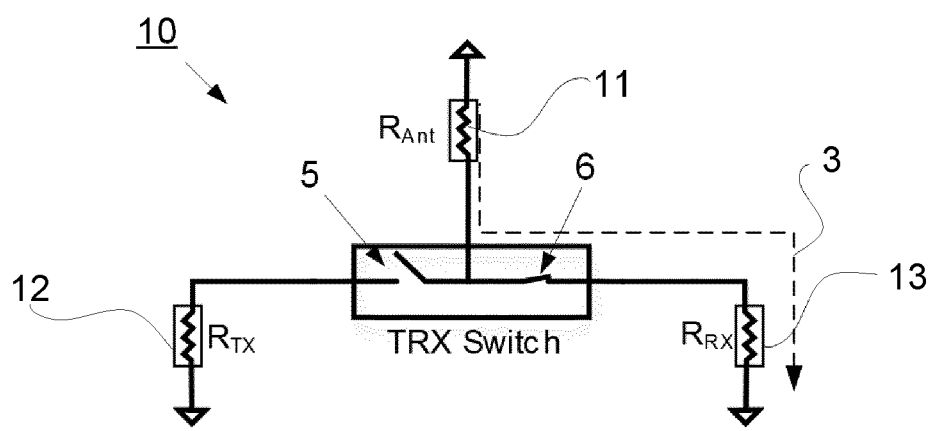

As mentioned above, FIGS. 1a and 1b describe the functionality of a prior art transceiver switch circuitry 10. Certain drawbacks have been identified for a transceiver to be suitable for use in 5G mm-wave transceivers, such as high insertion loss, low linearity or low bandwidth.

A high transmitter insertion loss results in low efficiency of the transmitter while a high receiver insertion loss results in loss of sensitivity for the receiver.

Low linearity of the transceiver may result in poor adjacent channel leakage power ratio, ACLR, at the antenna, compromising the error vector magnitude, EVM, and thus the performance of the transceiver. Complementary metal oxide semiconductor, CMOS, switches in current technology are quite non-linear when operating with large voltage swings. The TRX switch should be much more linear than the power amplifier, PA, in order not to be the dominant source of out-of-band spurious emissions in the Tx mode.

A wide bandwidth is highly desirable in mm-wave systems. If a switch has wideband enough that it covers a complete band, it is possible to reduce the cost and complexity of developing different variants of a product that operate in different sub-bands of the 3GPP frequency band.

In addition, it is highly desirable that the switch should have integrated filtering functionality to reduce or eliminate dependence on external filtering to meet 3GPP out-of-band spurious requirements.

In order to provide a high-power output with good back-off efficiency at mm-wave frequencies, many circuits use distributed amplifiers, such as Doherty Amplifiers. In such amplifiers, low output impedance is typically used to provide high power output while remaining within the safe voltage operating limits dictated by technology. A switch with integrated impedance matching of a low output impedance PA to a 50 Ω antenna is desirable.

The terms transceiver switch and transceiver switch circuitry are interchangeably used throughout the description.

Figure 2A:
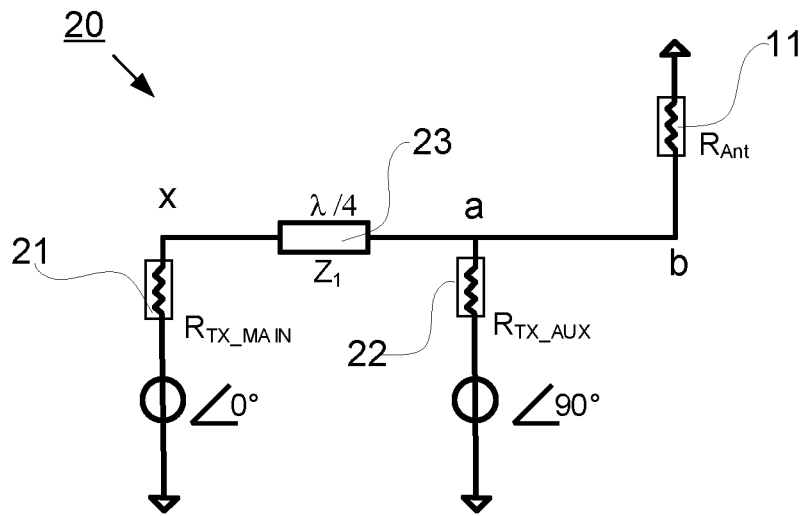
FIGS. 2a and 2b illustrate different implementations of Distributed Power Amplifiers, DPA.
Figure 2B:
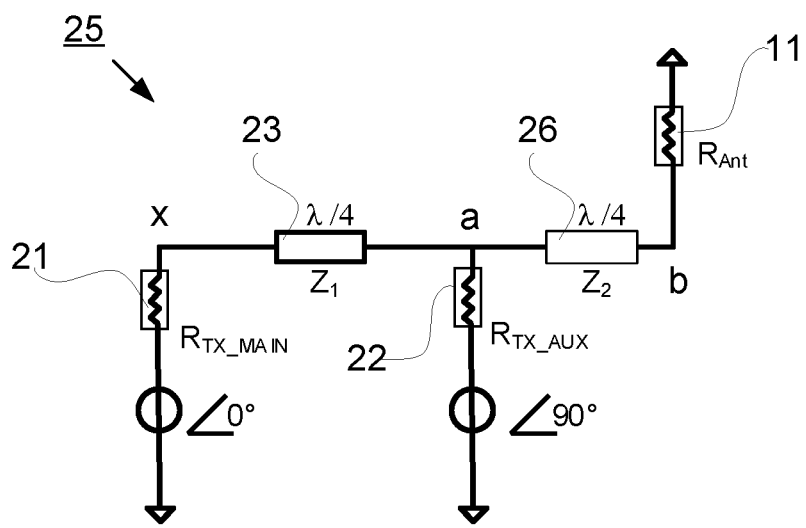
Figure 3A:
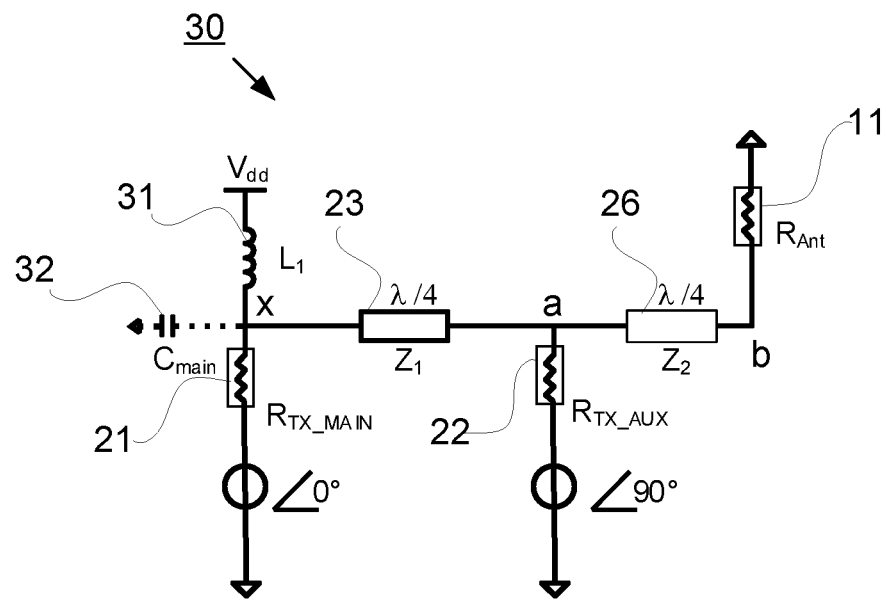
FIG. 3a illustrates a transmitter circuitry with DC power supply and parasitic capacitance.

FIG. 3a illustrates a transmitter circuitry of a Doherty power amplifier (DPA) 30 (similar to the Doherty amplifier 25 as shown in FIG. 2b) in addition with a DC power supply ($V_{dd}$) and parasitic capacitance 32 (also denoted as $C_{main}$). Typically, the DC power supply ($V_{dd}$) is supplied to the DPA 30 through an inductor 31 (also denoted as L1) that is then tuned to the wanted frequency with the parasitic capacitance 32 on an output node of the main amplifier 21. The DPA 30 further comprises a quarter wavelength, $\lambda/4$, impedance transformer 23 arranged between the main amplifier 21 and an auxiliary amplifier 22. Also, the DPA 30 comprises a quarter wavelength, $\lambda/4$, impedance transformer 26 arranged between the auxiliary amplifier 22 and an antenna circuitry 11. Similar to the Doherty amplifier 25 in FIG. 2b, the quarter wavelength, $\lambda/4$, impedance transformer 26 is added to the Doherty amplifier 30 in order to achieve a degree of freedom, which matches the impedance in node "a" to the antenna impedance.

Figure 3B:
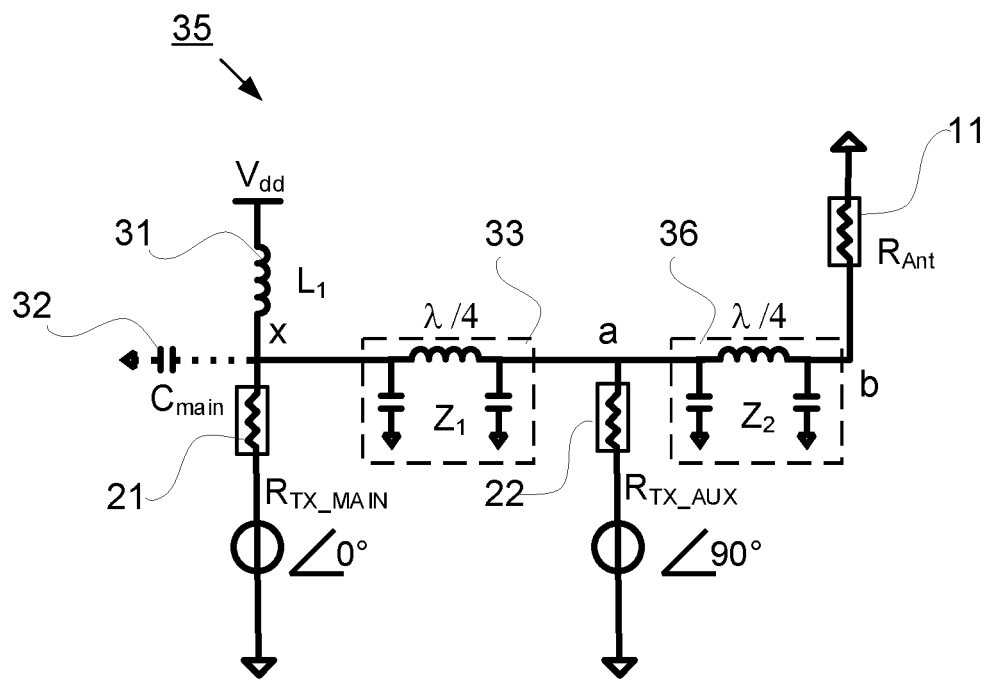

FIG. 3b illustrates a DPA 35 with a lumped component implementation of a quarter wavelength, $\lambda/4$, impedance transformer in the transmitter circuitries of the DPA 30 shown in FIG. 3a. The DPA 35 is shown implementing the quarter wavelength, $\lambda/4$, impedance transformers with lumped components arranged in a single pi section, indicated by 33 and 36, replacing each transmission lines 23 and 26 FIG. 3a. The lumped component are made up of discrete components comprising at least one inductor and at least one capacitor arranged in at least one pi or T section. In case where, an inductor 31 and a capacitor 32 are considered as part of another transmission line, the length of the transmission line is designed to be $\lambda/4$ and can implement the Tx mode switch functionality with the existing DPA structure. Hence, the transmission line is designed such that, for a length of $\lambda/4$ at the wanted frequency, it needs a capacitor size of $C_{main}$. This way, the parasitic capacitor 32 of the main stage amplifier 21 is absorbed into this transmission line. The parasitic output capacitance of the auxiliary branch (at the auxiliary amplifier 22) is similarly absorbed into the pi-section capacitances at node (a).

Figure 4:
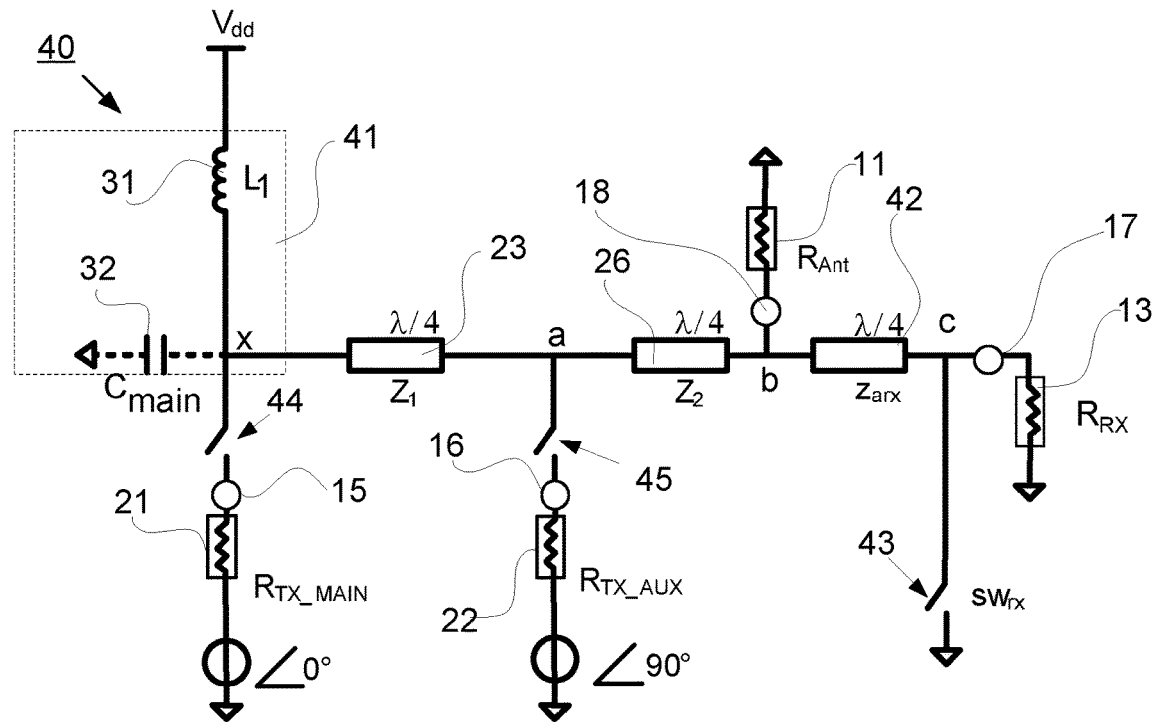

FIG. 4 illustrates a transceiver switch circuitry 40 with the transmitter circuitry of FIG. 3a. The transceiver switch circuitry 40 is configured with a receiver (Rx) side together with the DPA circuit 30 shown in FIG. 3a. Unlike to conventional transceiver switches, the proposed transceiver switch circuitry 40 does not include any complementary metal-oxide-semiconductor (CMOS) device acting as a switch in the Tx to antenna path on the Tx side to implement the TRX behavior during Rx mode. In Tx mode, the absence of these devices improves Tx insertion loss.

Advantageously, in the below reported circuits of FIGS. 4-8, the transmission lines needed to implement the Doherty PA are concurrently used to also implement the Tx to antenna path of the transceiver switch circuitry. The transceiver (TRX) switch circuitry is thus "absorbed" into the Doherty structure. The transceiver switch circuitry is linear and since no new active device is introduced in the transmitter, linearity in the Tx mode is only affected by how well the Rx is isolated from the Tx.

The transceiver switch circuitry 40 comprises an antenna port 18 connectable to an antenna circuitry 11, a receiver port 17 connectable to a receiver circuitry 13, a first amplifier port 15 connectable to a first amplifier circuitry 21 (e.g., main amplifier), and at least one second amplifier port 16 connectable to at least one second amplifier circuitry 22 (e.g., auxiliary amplifier). The transceiver switch circuitry 40 is configured to be operable in a reception mode to allow reception signals at the antenna port 18 to be forwarded to the receiver port 17. Similarly, the transceiver switch circuitry 40 is configured to be operable in a transmission mode to allow transmission of transmission signals at the first amplifier port 15 and the at least one second amplifier port 16 to be forwarded to the antenna port 18 for transmission.

According to some embodiments, the transmission signals have a transmission center frequency with a wavelength, $\lambda$, and the reception signals have a reception center frequency within ten percent of the transmission center frequency. That is, the reception center frequency is within a distance from the transmission center frequency that is less than a predefined fraction, and the fraction may for instance be less than 10%. In a TDD system, the Tx and Rx frequencies can be the same.

The transceiver switch circuitry 40 further comprises a receive arrangement connected between the antenna port 18 and the receiver port 17. The receive arrangement comprises a receiver quarter wavelength, $\lambda/4$, impedance transformer 42 and a receiver switch circuitry 43 configured to ground the receiver quarter wavelength, $\lambda/4$, impedance transformer 42 at the receiver port 17 in the transmission mode. The receive arrangement can be defined as a signal receiving path from the antenna circuitry 11 during the operation of the transceiver switch circuitry 40 in the reception mode.

The transceiver switch circuitry 40 further comprises a transmit arrangement connected between the antenna port 18, the first amplifier port 15 and the at least one second amplifier port 16. The transmit arrangement comprising a first and a second transmitter quarter wavelength, $\lambda/4$, impedance transformer, as well as an inductor 31 and parasitic capacitor 32 acting as a third transmitter quarter wavelength, $\lambda/4$, impedance transformer 41. The first transmitter quarter wavelength, $\lambda/4$, impedance transformer 26 having a first side connected to the antenna port 18 and a second side connected to a first side of the second transmitter quarter wavelength, $\lambda/4$, impedance transformer 23 and the third transmitter quarter wavelength, $\lambda/4$, impedance transformer 41 having a first side connected to a second side of the second transmitter quarter wavelength, $\lambda/4$, impedance transformer 23 and a second side connected to a DC supply voltage, $V_{dd}$. The transmit arrangement can be defined as a signal transmitting path to the antenna 11 during operation of the transceiver switch 40 in the transmission mode.

The first transmitter quarter wavelength, $\lambda/4$, impedance transformer 26 has an impedance that matches the transmitter impedance to the impedance of the antenna 11. For example, the impedance of the first transmitter quarter wavelength, $\lambda/4$, impedance transformer 26 and the impedance of the of the antenna 11 may be same and/or defined to be $Zm=(Z1*Z2)^0.5$, which indicates that the matching quarter wavelength, $\lambda/4$, impedance transformer impedance, such as 26 or 42 has an impedance according to the equation above.

The first amplifier port 15 is connected via a first transmitter switch circuitry 44 to the second side of the second transmitter quarter wavelength, $\lambda/4$, impedance transformer 23 and the at least one second amplifier port 16 is connected via a second transmitter switch circuitry 45 to the second side of the first transmitter quarter wavelength, $\lambda/4$, impedance transformer 26. The first and second switch circuitry 44 and 45 may be an integral part of the Doherty amplifier configuration i.e., the first switch circuitry 44 may be part of the first amplifier circuitry 21 and that the second switch circuitry 45 may be part of the at least one second amplifier circuitry 22. The first switch circuitry 44 is configured to disconnect the first amplifier port 15 from the transmitter quarter wavelength, $\lambda/4$, impedance transformer 23 in the reception mode. Similarly, the second switch circuitry 45 is configured to disconnect the second amplifier port 16 of the at least one second amplifier circuitry 22 from the transmitter quarter wavelength, $\lambda/4$, impedance transformer 26 in the reception mode.

According to some embodiments, the first amplifier circuitry 21 can be a main amplifier or carrier amplifier and the second amplifier circuitry 22 can be an auxiliary amplifier or a peaking amplifier. The main amplifier and the auxiliary amplifier may be a Doherty amplifier.

According to some embodiments, the proposed transceiver switch circuitry 40 (TRX switch) is integrated into a Doherty PA (of FIG. 3a) such that it largely uses the existing elements (transmission lines and CMOS devices) of the PA to implement the TX side of the TRX switch. This results in very low TX insertion loss compared to existing solutions. The parasitic of the switches are absorbed into the pi-segment implementation of the transmission lines, as detailed below.

Figure 5:
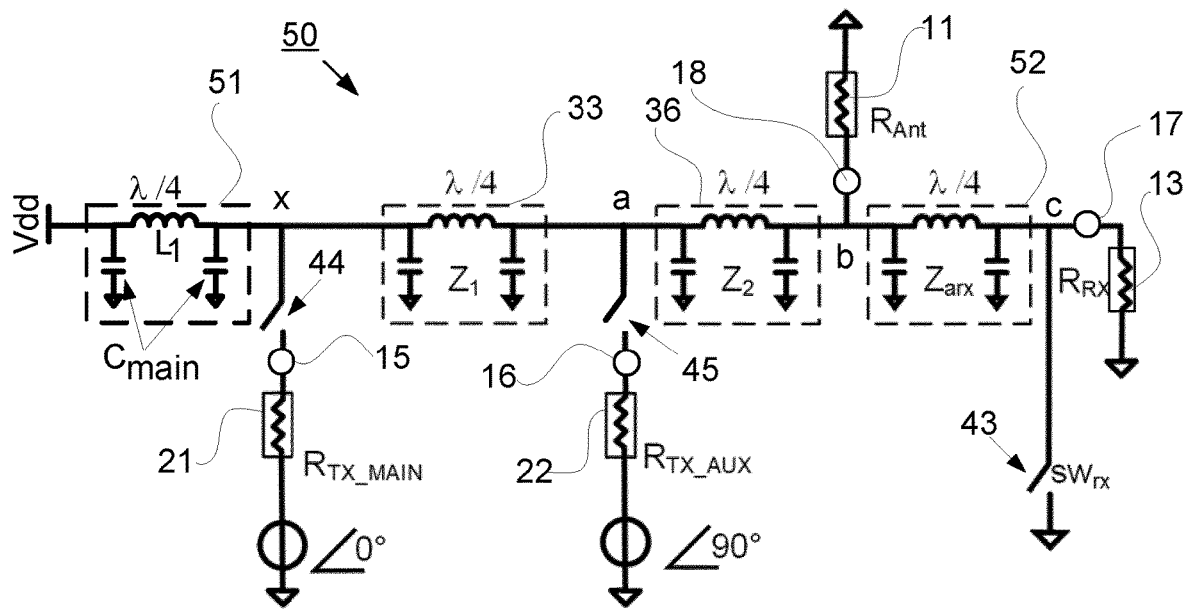
FIG. 5 illustrates a lumped component implementation of a quarter wavelength, $\lambda/4$, impedance transformer in the transceiver switch circuitry of FIG. 4.

FIG. 5 illustrates an example transceiver switch circuitry 50, which is an implementation of a quarter wavelength, $\lambda/4$, impedance transformer in the transceiver switch circuitry 40 of FIG. 4. The transceiver switch circuitry 50 is shown implementing the quarter wavelength, $\lambda/4$, impedance transformers with lumped components arranged in a single pi section, indicated by 33, 36 and 52, replacing each transmission line 23, 26 and 42 as seen in FIG. 4. The transceiver switch circuitry 50 comprises the transmit arrangement which comprises a first, a second and a third transmitter quarter wavelength, $\lambda/4$, impedance transformer. The first transmitter quarter wavelength, $\lambda/4$, impedance transformer 36 having a first side connected to the antenna port 18 and a second side connected to a first side of the second transmitter quarter wavelength, $\lambda/4$, impedance transformer 33. The third transmitter quarter wavelength, $\lambda/4$, impedance transformer 51 having a first side connected to a second side of the second transmitter quarter wavelength, $\lambda/4$, impedance transformer 33 and a second side connected to a DC supply voltage, $V_{dd}$. In this example, the third transmitter quarter wavelength, $\lambda/4$, impedance transformer 51 comprises an inductor ($L_1$) and two parasitic capacitances ($C_{main}$).

According to some embodiments, the lumped components comprise at least one inductor, L, and at least one capacitor, C, arranged in at least one pi section or T section (not shown). According to some embodiments, a first side of each capacitor C is connected to ground and a first and second side of the at least one inductor L is connected between a second side of each capacitor C. The first and second side of the inductor L constitutes connection points of each pi section. The lumped components implemented in the transceiver switch circuitry 50 comprise one inductor and two capacitors arranged in a single pi section. The bandwidth of the line increases along with the number of passive sections (in this embodiment pi sections) used to implement a transmission line with the required electrical length.

Figure 6:
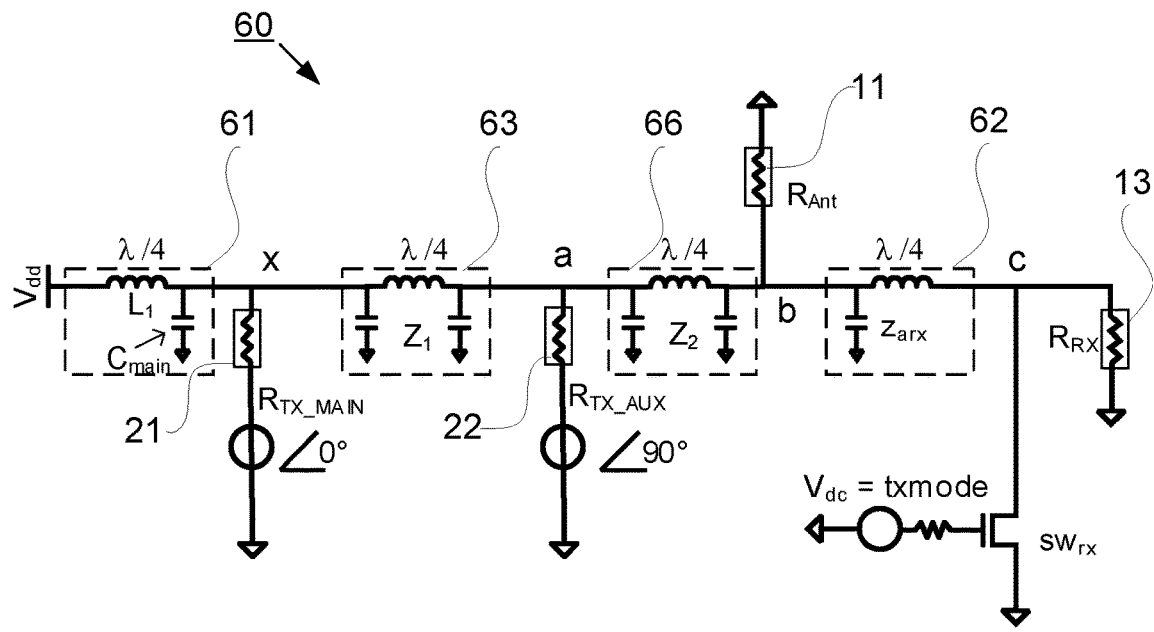
FIG. 6 illustrates a transceiver with integrated switches in Tx mode.

FIG. 6 illustrates a transceiver switch circuitry 60 with integrated switches in transmission (Tx) mode. The transceiver switch circuitry 60 is shown implementing the quarter wavelength, $\lambda/4$, impedance transformers with lumped components arranged in a single pi section, indicated by 61, 63, 66 and 62, replacing each transmission line 23, 26 and 42 as seen in FIG. 4. The receive arrangement comprises a receiver pi-section 62 and a receiver switch $SW_{rx}$. The receiver switch $SW_{rx}$ is configured with a DC voltage (Vdc). The pi section 62 is modified and comprises the lumped components including one inductor and one capacitor since the parasitic capacitance of the receiver switch $SW_{rx}$ will contribute to the functionality of the pi section 62.

The transceiver switch circuitry 60 comprises the transmit arrangement comprising a first pi-section 66 having a first connected to the antenna port 18 (at node (b)) and a second side connected to a first side of the second pi-section 63. The third pi-section 61 having a first side connected to a second side of the second pi-section 63 and second side of the pi-section 61 to a DC supply voltage, Vdd. According to some embodiments, both the first pi-section 66 and the second pi-section 63 comprises one inductor and two parasitic capacitances. The third pi-section 61 is also modified and comprises an inductor ($L_1$) and only one parasitic capacitances ($C_{main}$) since a capacitance connected to the DC supply voltage may be omitted.

In the Tx mode, the switch $SW_{rx}$ is ON and a low impedance is seen at node (c). quarter wavelength, λ/4, impedance transformer 62 having an impedance of $Z_{arx}$ translates this impedance to a high impedance towards the receiver from the antenna port (i.e. node (b)). The modified pi section 62 has an impedance that matches the impedance of the receiver circuitry to the antenna 11.

As seen in FIG. 6, the first amplifier 21 branch at node (x) and the second amplifier 22 branch at node (a) are in conducting state with a phase shift transmission signals in the transmission mode. The conducting state of both the first amplifier 21 and the second amplifier 22 are configured by operating the respective interconnected switches 44 and 45. The capacitor $C_{main}$ on the $V_{dd}$ side is removed since $V_{dd}$ is an AC ground. It is important to note that the $V_{dd}$ node is a good AC ground to de-couple any voltage change in this node to ground in order to minimize variation in the supply voltage.

Figure 7A:
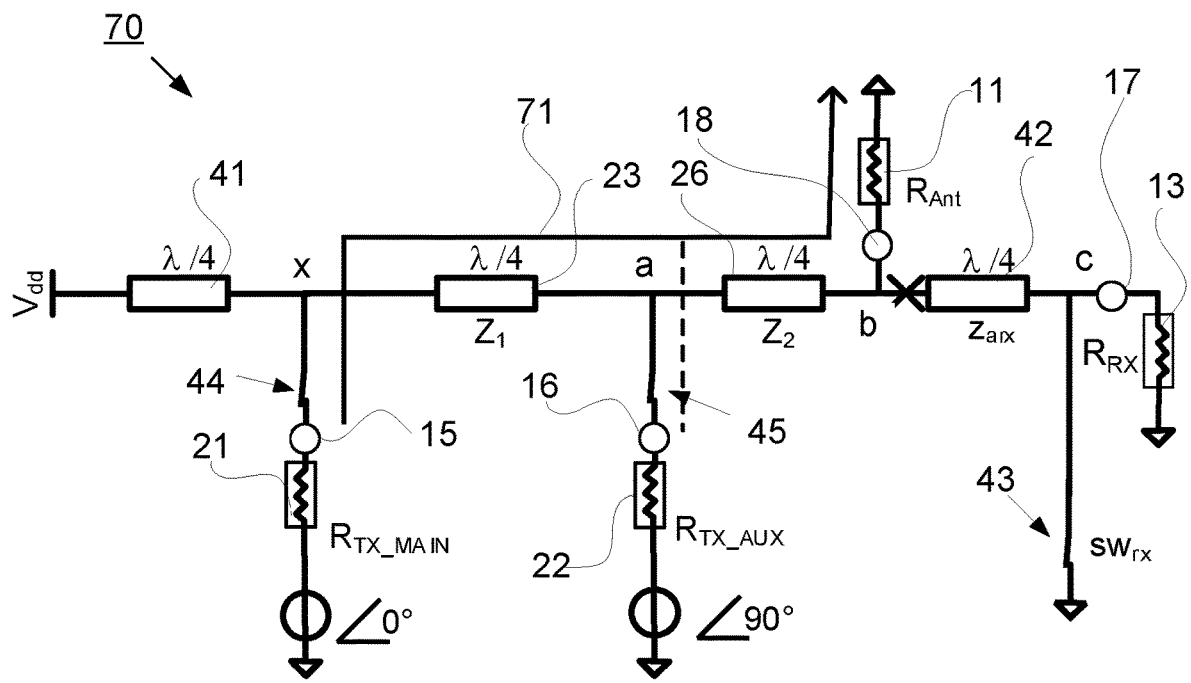
FIGS. 7a and 7b illustrate the functionality of an example transceiver switch circuitry.
Figure 7B:
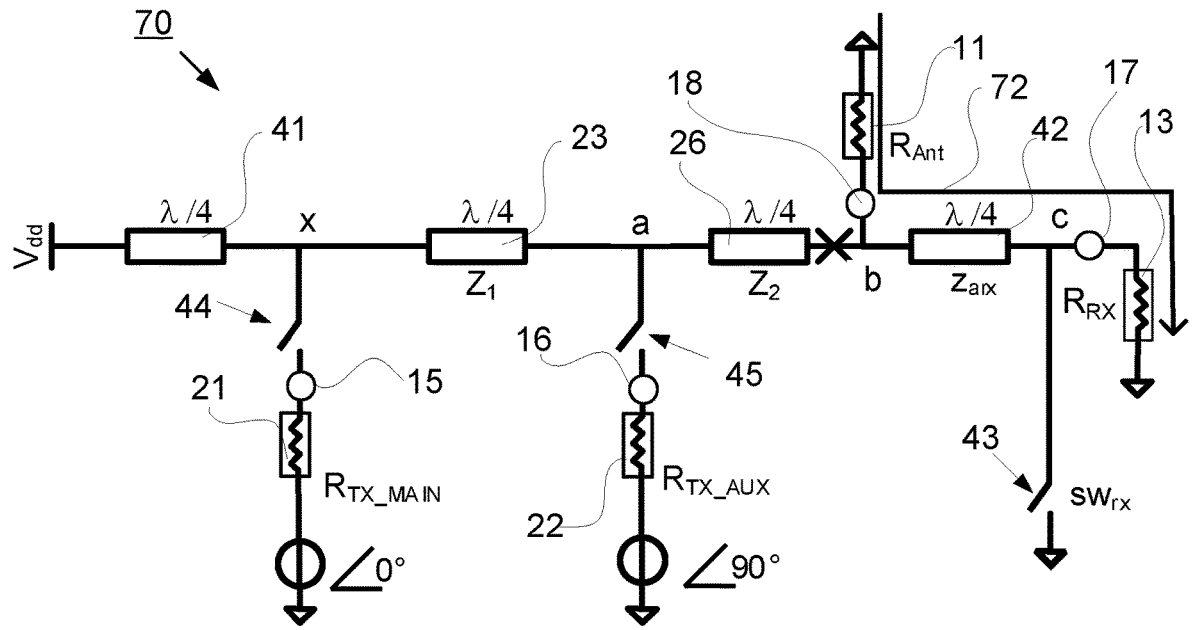

FIGS. 7a and 7b illustrate the functionality of an example transceiver switch circuitry 70. The transceiver switch circuitry 70 is shown implementing the lumped components of the transceiver switch circuitry 60 in FIG. 6 with quarter wavelength, λ/4, impedance transformers indicated as 42, 26, 23 and 41. The transceiver switch circuitry 70 comprises the transmit arrangement comprising the first, the second and the third transmitter quarter wavelength, λ/4, impedance transformer. The first transmitter quarter wavelength, λ/4, impedance transformer 26 having the first side connected to the antenna port 18 and the second side connected to the first side of the second transmitter quarter wavelength, λ/4, impedance transformer 23. The third transmitter quarter wavelength, λ/4, impedance transformer 41 having the first side connected to the second side of the second transmitter quarter wavelength, λ/4, impedance transformer 23 and the second side connected to the DC supply voltage, Vdd. The transceiver switch circuitry 70 further comprises the receive arrangement connected between the antenna port 18 and the receiver port 17. The receive arrangement comprises the receiver quarter wavelength, λ/4, impedance transformer 42 and the receiver switch circuitry 43 configured to ground the receiver quarter wavelength, λ/4, impedance transformer 42 at the receiver port 17 in the transmission mode. The receive arrangement can be defined as the signal receiving path from the antenna circuitry 11 during the operation of the transceiver switch circuitry 40 in the reception mode.

Referring to FIG. 7a, the transceiver switch circuitry 70 is configured to operate in Tx mode in that the switch 43 is conducting in Tx mode. This results in a small voltage swing across it, resulting in very low impact on linearity of the transceiver in Tx mode. In addition to the switch 43 the switches 44 and 45 are also in conducting state in Tx mode. Thus, by virtue of the operating state (i.e., conducting state) of the switches 43, 44 and 45 the transmission of the transmission signals 71 at the first amplifier port 15 and the at least one second amplifier port 16 can be forwarded to the antenna port 18 for transmission and stopping the transmission signals 71 from entering to the receiver quarter wavelength, λ/4, impedance transformer 42 as indicated by the cross at node (b).

Similarly, referring to FIG. 7b, the transceiver switch circuitry 70 is configured to operate in reception (Rx) mode in that the switch 43 is in non-conducting state. In Rx mode, the switch 43 is OFF and impedance observed at node (c) is equal to $R_{RX}$ Ω. The receiver quarter wavelength, λ/4, impedance transformer 42 matches this impedance to an impedance of the antenna circuitry 11. The impedance of the receiver circuitry (13) maybe same as the impedance of the antenna circuitry 11 i.e., $Z_{arx}=R_{ant}=R_{RX}$. At node (b), in the Rx mode, the received signal 72 at the antenna circuitry 11 take the path (shown in directed line) as long as high impedance is observed into the DPA output from node (b) stopping received signal 72 from entering the first transmitter quarter wavelength, λ/4, impedance transformer 26 as indicated by the cross at node (b). Also, both the first amplifier 21 and the second amplifier 22 branches are biased in Rx mode to conduct no current and thereby present high impedance at the output nodes (x) and (a), respectively. Since, the supply node is an AC ground, the third transmitter quarter wavelength, λ/4, impedance transformer 41 transforms this to a high impedance at node (x) since the first amplifier 21 branch is OFF. This, in turn translates to a low impedance at node (a) and, ultimately, to a high impedance at node (b). Thus, by virtue of the operating state (i.e., non-conducting state) of the switches 43, 44 and 45 the DPA output from node (b), the received signal 72 experiences a large impedance and will take the Rx path through the receiver quarter wavelength, λ/4, impedance transformer 42 to the receiver. Thus, the reception signals (72) during reception mode only passes via the receiver quarter wavelength, λ/4, impedance transformer 42. The receiver quarter wavelength, λ/4, impedance transformer 42 has an impedance that matches the impedance of the receiver circuitry to the antenna circuitry 11. In some embodiments, the reception center frequency is equal to the transmission center frequency.

Figure 15:
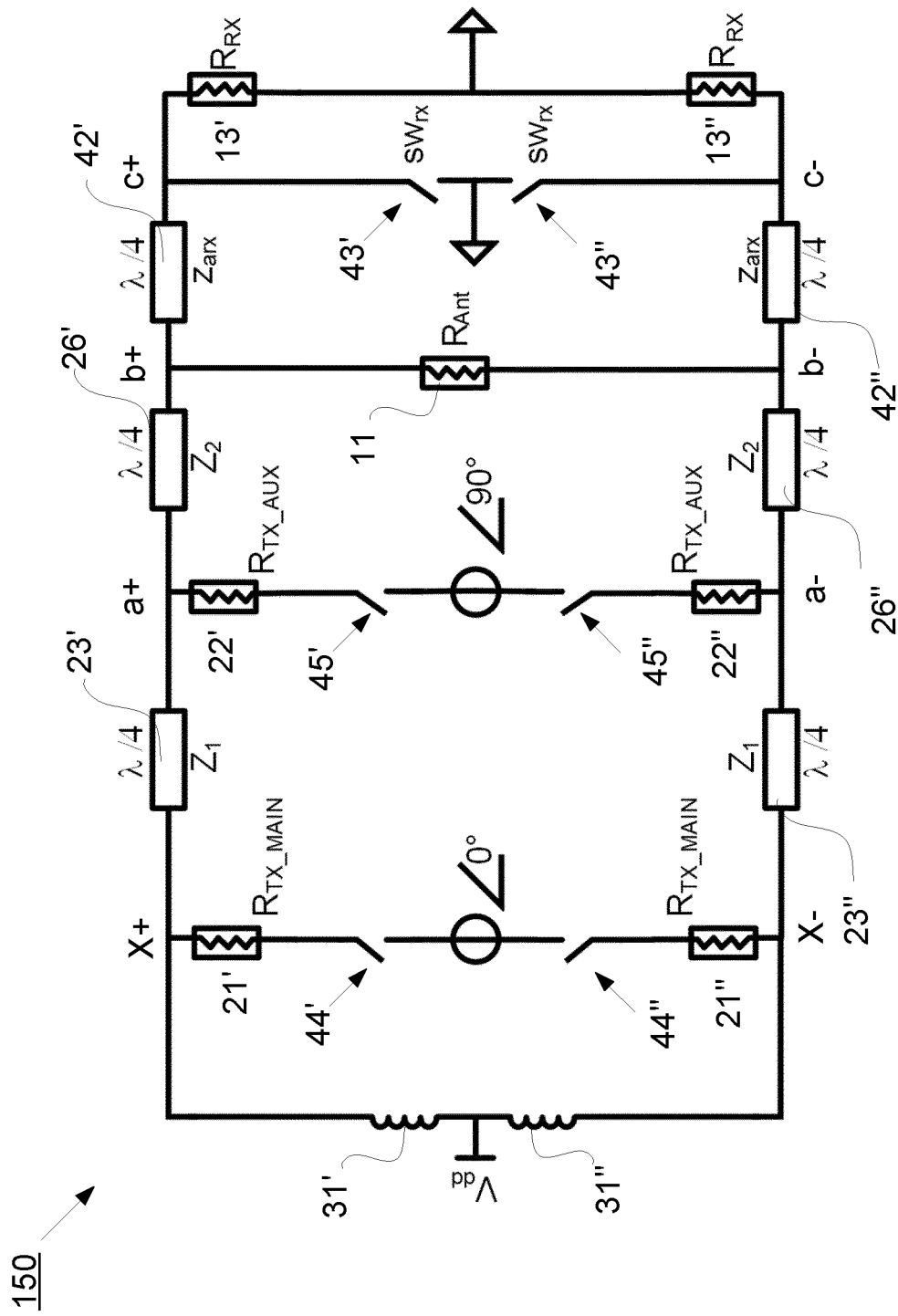
FIG. 15 illustrates an example of a differential implementation of Distributed Power Amplifiers.

FIG. 15 illustrates a differential implementation of a distributed power amplifier similar to the transceiver switch circuitry illustrated in FIGS. 7a and 7b. On the positive side of the differential configuration transmission lines are denoted 23', 26' and 42', switch circuitry are denoted 43', 44' and 45', inductor is denoted 31', receiver circuitry is denoted 13' and amplifiers are denoted 21' and 22'. Similarly, on the negative side of the differential configuration transmission lines are denoted 23", 26" and 42", switch circuitry are denoted 43", 44" and 45", inductor is denoted 31", receiver circuitry is denoted 13" and amplifiers are denoted 21" and 22".

Figure 8:
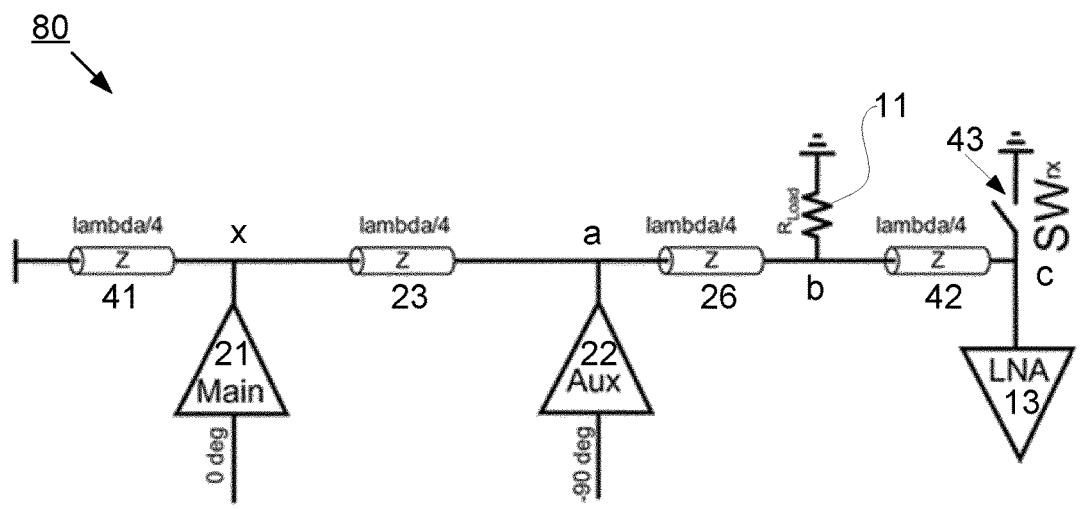
FIG. 8 illustrates a schematic of a transceiver used for simulation.

FIG. 8 illustrates a schematic layout 80 of a transceiver switch 40, 50, 60, 70 used for simulation. As seen in the schematic layout 80, the transceiver switch circuitry 40, 50, 60, 70 comprises an arrangement of a Doherty amplifier as a transmit arrangement, a low noise amplifier, LNA, as receive arrangement and the antenna 11.

The Doherty amplifier of the schematic layout 80 is a Doherty PA operating at 22 GHz is implemented in cadence using Global Foundries, GF, 22 nm fully depleted Silicon on Insulator, FD-SOI, CMOS process. Transmission lines are implemented using lumped L/C components. Inductors are drawn in the upper thick copper metal layers and simulated in ADS momentum. Transistors in the first and second amplifiers 21, 22 are laid out and extracted views are used for simulations.

Figure 9:
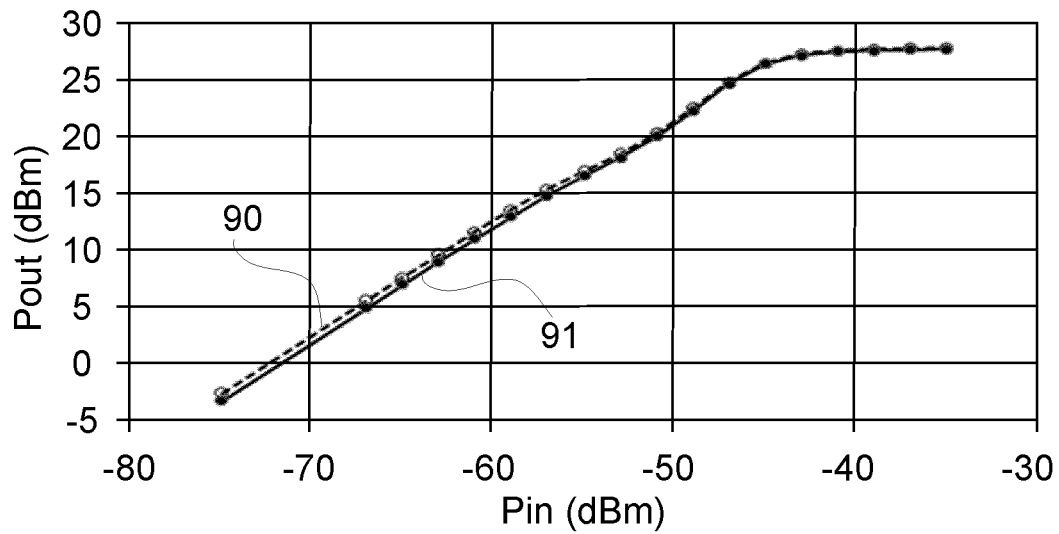
FIG. 9 illustrates simulation results for Tx output power for two different configurations of the transceiver of FIG. 8.
Figure 10:
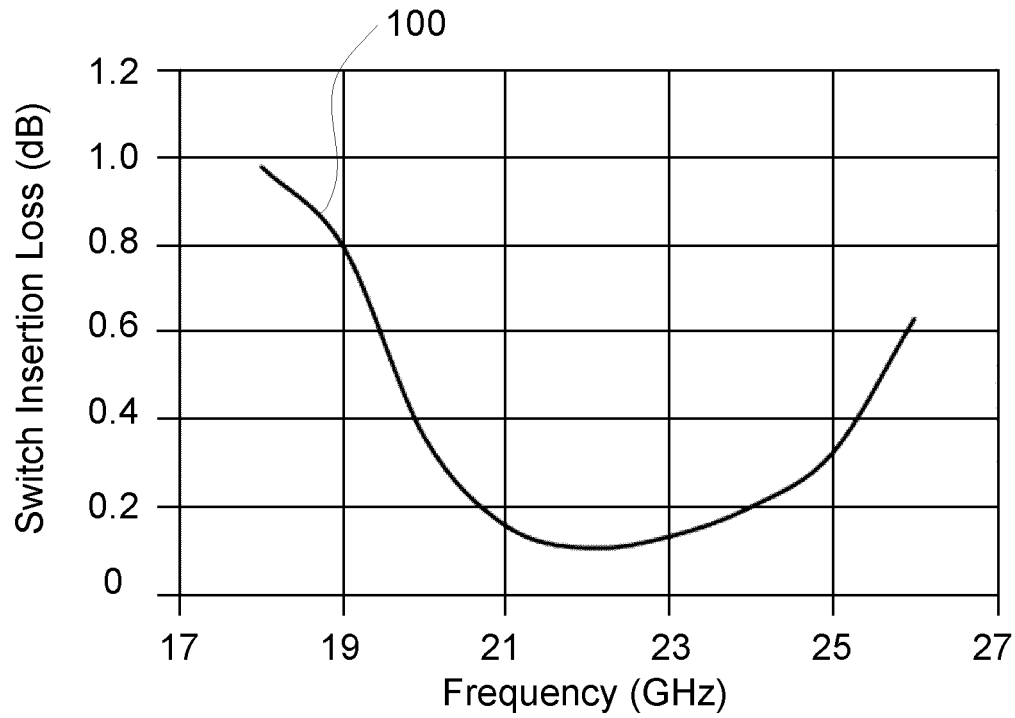
FIG. 10 illustrates simulation results for transmitter insertion loss at maximum output power for the transceiver of FIG. 8.

FIG. 9 illustrates simulation results for transmission output power for two different configurations of the transceiver of FIG. 8. The simulation results display the transmission output power when having the transmission line $Z_{arx}$ connection and without it i.e., without the integrated switches and without transmission line connection to the receiver circuitry 13 indicated by dashed line 90 and with both the integrated switches and the transmission line connection indicated by solid line 91. FIG. 10 illustrates simulation results for transmitter insertion loss for the transceiver of FIG. 8. The simulation results display a curve 100 for the transmission insertion loss at Psat (~27 dBm) plotted against frequency.

Figure 11:
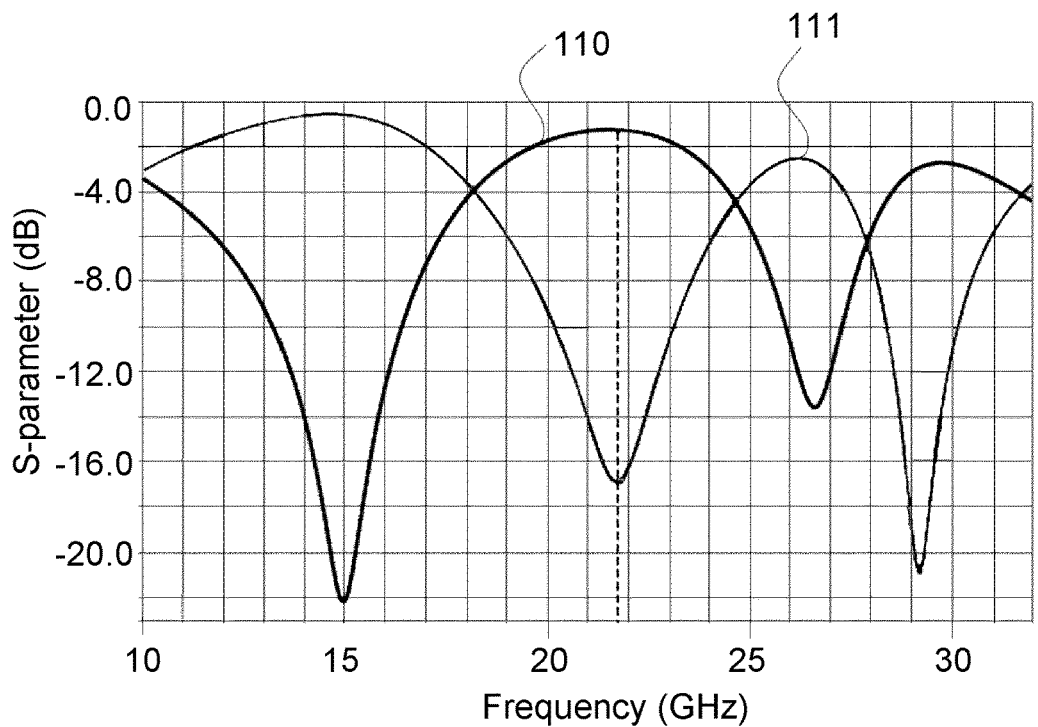
FIG. 11 illustrates simulation results for receiver insertion loss and Rx matching for the transceiver of FIG. 8.

FIG. 11 illustrates simulation results for receiver insertion loss and Rx matching for the transceiver of FIG. 8. The transceiver switch circuit insertion loss (S12) is indicated by curve 111 and RX matching (S11) is indicated by curve 110. The second amplifier 22 is configured in a conductive mode so that it shorts its output to ground, creating a high impedance into TX, as seen from the antenna circuitry 11. To avoid DC current to flow from Vdd to GND through the second amplifier 22, Vdd is pulled to GND.

Figure 12:
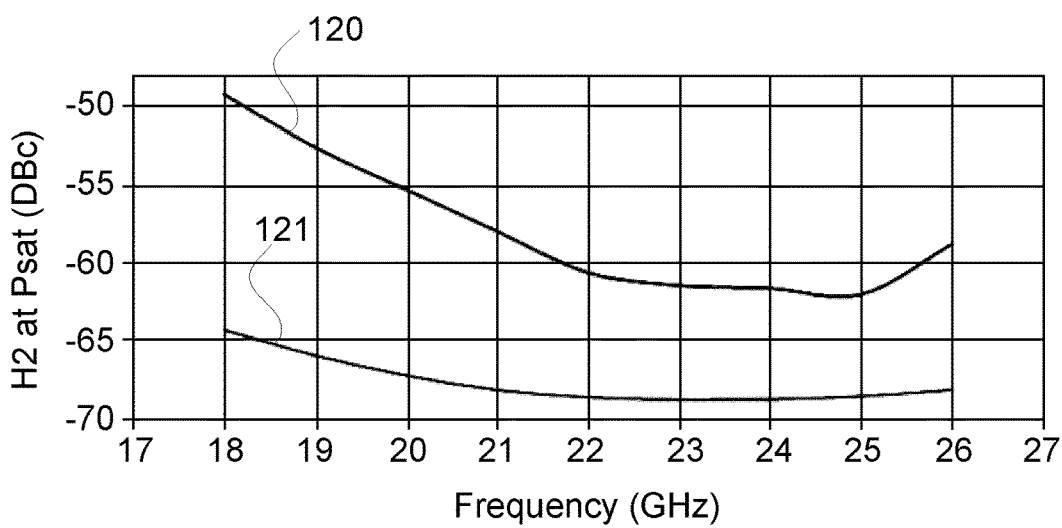
FIG. 12 illustrates simulation results for filtering of second order harmonics and IM2 for the transceiver of FIG. 8.

FIG. 12 illustrates simulation results for filtering of second order harmonics and IM2 for the transceiver of FIG. 8. The simulation results display the characteristic for the second order harmonics (H2) at Psat for the TRX switch. The simulation results show the second order harmonics without the receiver switch $SW_{rx}$ indicated by line 120, and with the receiver switch $SW_{rx}$ indicated by solid line 121. The proposed TRX switch helps filter out second harmonic since it is based on electrical lengths of transmission lines which will not be tuned correctly at twice the frequency.

Figure 13:
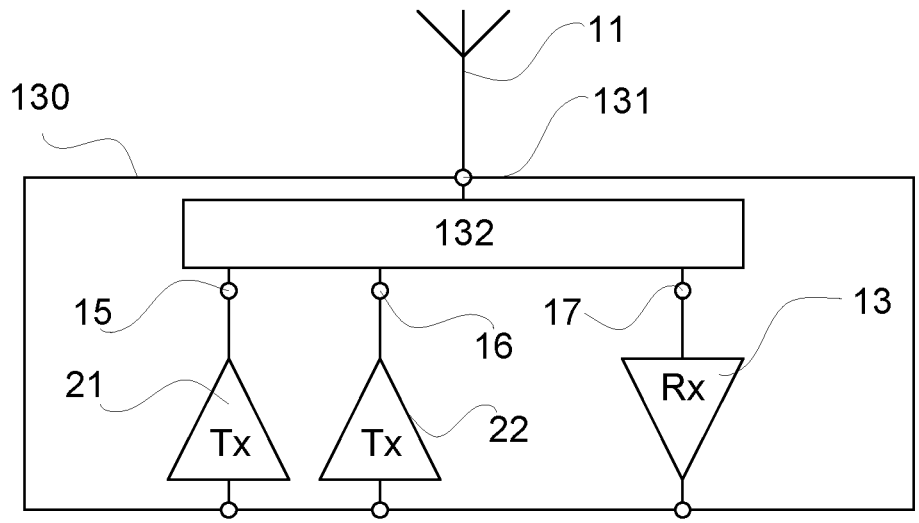
FIG. 13 illustrates a transceiver with a transceiver switch circuitry.

FIG. 13 illustrates a transceiver 130 with a transceiver switch circuitry 132 in accordance with some embodiments of the present disclosure. The transceiver switch circuitry 132 is illustrated in the transceiver 130 for wireless communication. The transceiver switch circuitry 132 is connectable to the antenna 11 via an antenna port 131 for transmitting transmission signals (such as transmission signals 71) during transmission mode, and receiving reception signals (such as reception signals 72) during reception mode.

The transceiver 130 comprises a first transmitter 21 connected to a first transmitter port 15 of the transceiver switch circuitry 132 and at least one second transmitter 22 connected to at least one second transmitter port 16 of the transceiver switch circuitry 132. The first transmitter 21 and the at least one second transmitter 22 are configured to generate transmission signals (such as transmission signals 71). The transceiver 130 comprises a receiver 13 connected to a receiver port 17 of the transceiver switch circuitry 132 and is configured to receive reception signals (such as reception signals 72). The first transmitter 21 and the at least one second transmitter 2 may comprise a Doherty amplifier.

Figure 14:
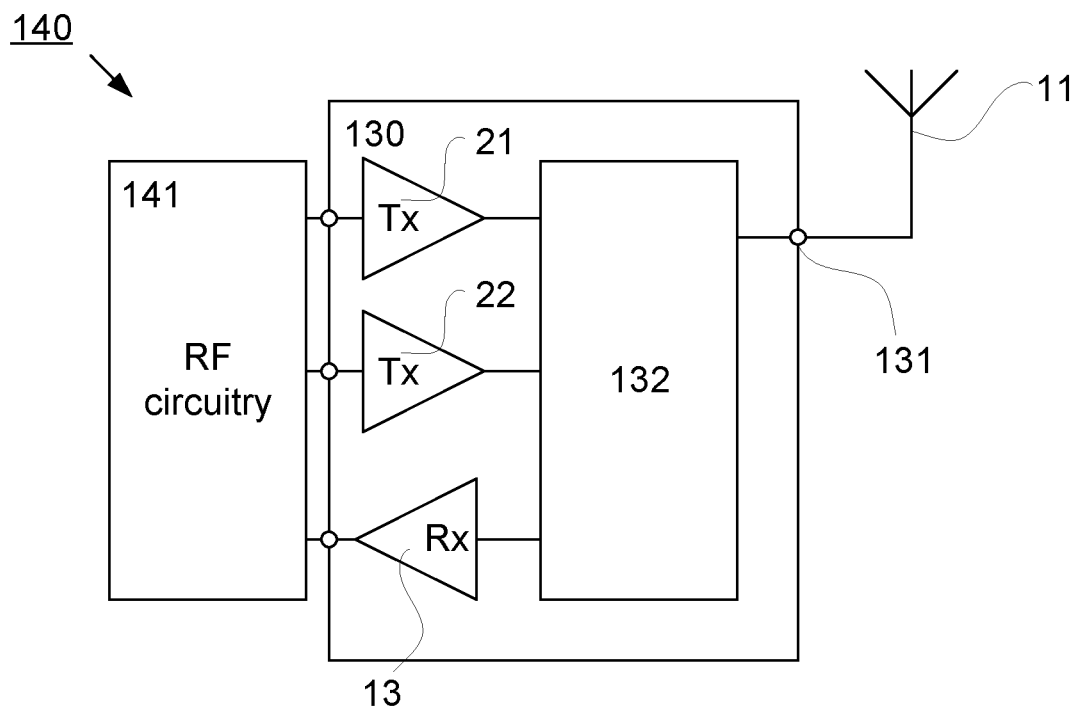
FIG. 14 illustrates an example communication node with a transceiver of FIG. 13.

FIG. 14 illustrates an example communication node 140 with a transceiver 130 of FIG. 13. The communication node 140 comprises the transceiver 130 and a communication arrangement 11 connected to the antenna port 131. The communication network is in this example a wireless network and the communication arrangement is an antenna 11. The communication node 140, as an example, may be a wireless device or a base station.

The present disclosure is related to a transceiver switch circuitry 40, 50, 60, 70, 80, 150 comprising an antenna port 18 connectable to an antenna circuitry 11, a receiver port 17 connectable to a receiver circuitry 13, a first amplifier port 15 connectable to a first amplifier circuitry 21, and at least one second amplifier port 16 connectable to at least one second amplifier circuitry 22, wherein the transceiver switch circuitry is configured to be operable in a reception mode to allow reception signals 72 at the antenna port 18 to be forwarded to the receiver port 17, and configured to be operable in a transmission mode to allow transmission of transmission signals 71 at the first amplifier port 15 and the at least one second amplifier port 16 to be forwarded to the antenna port 18 for transmission, the transmission signals 71 having a transmission center frequency with a wavelength, $\lambda$, and the reception signals 72 having a reception center frequency within ten percent of the transmission center frequency, wherein the transceiver switch circuitry 40, 50, 60, 70, 80 further comprises:

a receive arrangement connected between the antenna port 18 and the receiver port 17, the receive arrangement comprising a receiver quarter wavelength, $\lambda/4$, impedance transformer 42 and a receiver switch circuitry 43 configured to ground the receiver quarter wavelength, $\lambda/4$, impedance transformer 42 at the receiver port 17 in the transmission mode; and a transmit arrangement connected between the antenna port 18, the first amplifier port 15 and the at least one second amplifier port 16, the transmit arrangement comprising a first, a second and a third transmitter quarter wavelength, $\lambda/4$, impedance transformer, the first transmitter quarter wavelength, $\lambda/4$, impedance transformer 26; 36; 66 having a first side connected to the antenna port 18 and a second side connected to a first side of the second transmitter quarter wavelength, $\lambda/4$, impedance transformer 23, 33, 63, and the third transmitter quarter wavelength, $\lambda/4$, impedance transformer 41, 51, 61 having a first side connected to a second side of the second transmitter quarter wavelength, $\lambda/4$, impedance transformer 23, 33, 63 and a second side connected to a DC supply voltage, $V_{dd}$; wherein the first amplifier port 15 is connected via a first transmitter switch circuitry 44 to the second side of the second transmitter quarter wavelength, $\lambda/4$, impedance transformer 23, 33, 63, and the at least one second amplifier port 16 is connected via a second transmitter switch circuitry 45 to the second side of the first transmitter quarter wavelength, $\lambda/4$, impedance transformer 26; 36; 66; wherein the first and second transmitter switch circuitry 44, 45 are configured to disconnect the first amplifier port 15 and the at least one second amplifier port 16 from the respective transmitter quarter wavelength, $\lambda/4$, impedance transformer 23, 26, 33, 36, 63, 66 in the reception mode.

According to some embodiments, the receive arrangement is further configured to phase shift reception signals 72 in the reception mode, and the transmit arrangement is further configured to phase shift transmission signals 71 in the transmission mode.

According to some embodiments, the reception signals 72 during reception mode only passes via the receiver quarter wavelength, $\lambda/4$, impedance transformer 42, 52, and 62.

According to some embodiments, the receiver quarter wavelength, λ/4, impedance transformer 42, 52, and 62 has an impedance that matches the impedance of the receiver circuitry to the antenna.

According to some embodiments, the first transmitter quarter wavelength, λ/4, impedance transformer 26, 36, and 66 has an impedance that matches the transmitter impedance to the impedance of the antenna According to some embodiments, each quarter wavelength, λ/4, impedance transformer is a transmission line having a length of λ/4 of the transmission center frequency According to some embodiments, each quarter wavelength, λ/4, impedance transformer comprises passive lumped components.

According to some embodiments, the lumped components comprise at least one inductor 31; 31', 31" and at least one capacitor 32 arranged in at least one pi or T section.

According to some embodiments, the third transmitter quarter wavelength, λ/4, impedance transformer 51; 61 comprises an inductor ($L_1$) and a parasitic capacitance ($C_{main}$).

According to some embodiments, the reception center frequency is equal to the transmission center frequency.

According to some embodiments, the transceiver switch circuitry is adapted for differential operation.

The present disclosure also relates to a transceiver 130 for wireless communication comprising:
- a transceiver switch circuitry 132, as described above, being connectable to an antenna 11 via an antenna port 131 for transmitting transmission signals during transmission mode, and receiving reception signals during reception mode;
- a first amplifier 21 connected to a first amplifier port 15 of the transceiver switch circuitry and a second amplifier 22 connected to a second amplifier port 16 of the transceiver switch circuitry, the first amplifier and second amplifier being configured to generate transmission signals; and
- a receiver 13 connected to a reception port 17 of the transceiver switch circuitry and being configured to receive reception signals.

According to some embodiments, the first amplifier and second amplifier is a Doherty amplifier.

According to some embodiments, two transceiver switch circuitries are provided being arranged in a differential configuration.

The present disclosure further relates to a communication node 140 in a communication network comprising a transceiver 130 and a communication arrangement 11 connected to the antenna port 131 of the transceiver 130.

According to some embodiments, the communication network is a wireless network and the communication arrangement is an antenna 11.

According to some embodiments, the communication node is a wireless device or a base station.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE may have been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

Also note that terminology such as eNodeB and wireless device should be considered as non-limiting and does in particular not imply a certain hierarchical relation between the two. In general "eNodeB" could be considered as device 1 and "wireless device" as device 2, and these two devices communicate with each other over some radio channel.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of transceiver switch circuitry, transceivers and nodes. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, and that several "means", "units" or "devices" may be represented by the same item of hardware.

A "wireless device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as having any number of antennas or antenna elements.

Although the description is mainly given for a transceiver switch circuitry, it should be understood by the skilled in the art that the transceiver switch circuitry is a part of a transceiver which is implemented in any wireless device, terminal, or node capable of receiving in DL and transmitting in UL (e.g. PDA, laptop, mobile, sensor, fixed relay, mobile relay or even a radio base station, e.g. femto base station).

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A transceiver switch circuitry comprising:
    an antenna port connectable to an antenna circuitry;
    a receiver port connectable to a receiver circuitry;
    a first amplifier port connectable to a first amplifier circuitry;
    at least one second amplifier port connectable to at least one second amplifier circuitry;
    the transceiver switch circuitry being configured to be operable in a reception mode to allow reception signals at the antenna port to be forwarded to the receiver port, and configured to be operable in a transmission mode to allow transmission of transmission signals at the first amplifier port and the at least one second amplifier port to be forwarded to the antenna port for transmission, the transmission signals having a transmission center frequency with a wavelength, $\lambda$, and the reception signals having a reception center frequency within ten percent of the transmission center frequency;
    a receive arrangement connected between the antenna port and the receiver port, the receive arrangement comprising a receiver quarter wavelength, $\lambda/4$, impedance transformer and a receiver switch circuitry configured to ground the receiver quarter wavelength, $\lambda/4$, impedance transformer at the receiver port in the transmission mode; and
    a transmit arrangement connected between the antenna port, the first amplifier port and the at least one second amplifier port, the transmit arrangement comprising a first, a second and a third transmitter quarter wavelength, $\lambda/4$, impedance transformer, the first transmitter quarter wavelength, $\lambda/4$, impedance transformer having a first side connected to the antenna port and a second side connected to a first side of the second transmitter quarter wavelength, $\lambda/4$, impedance transformer, and the third transmitter quarter wavelength, $\lambda/4$, impedance transformer having a first side connected to a second side of the second transmitter quarter wavelength, $\lambda/4$, impedance transformer and a second side connected to a DC supply voltage, $V_{dd}$;
    the first amplifier port is being connected via a first transmitter switch circuitry to the second side of the second transmitter quarter wavelength, $\lambda/4$, impedance transformer;
    the at least one second amplifier port is connected via a second transmitter switch circuitry to the second side of the first transmitter quarter wavelength, $\lambda/4$, impedance transformer; and
    the first and second transmitter switch circuitry being configured to disconnect the first amplifier port and the at least one second amplifier port from the respective transmitter quarter wavelength, $\lambda/4$, impedance transformer in the reception mode.

2. The transceiver switch circuitry according to claim 1, wherein the receive arrangement is further configured to phase shift reception signals in the reception mode, and the transmit arrangement is further configured to phase shift transmission signals in the transmission mode.

3. The transceiver switch circuitry according to claim 1, wherein the reception signals during reception mode only passes via the receiver quarter wavelength, $\lambda/4$, impedance transformer.

4. The transceiver switch circuitry according to claim 1, wherein the receiver quarter wavelength, $\lambda/4$, impedance transformer has an impedance that matches the impedance of the receiver circuitry to the antenna.

5. The transceiver switch circuitry according to claim 1, wherein the first transmitter quarter wavelength, $\lambda/4$, impedance transformer has an impedance that matches the transmitter impedance to the impedance of the antenna.

6. The transceiver switch circuitry according to claim 1, wherein each quarter wavelength, $\lambda/4$, impedance transformer is a transmission line having a length of $\lambda/4$ of the transmission center frequency.

7. The transceiver switch circuitry according to claim 1, wherein each quarter wavelength, $\lambda/4$, impedance transformer comprises passive lumped components.

8. The transceiver switch circuitry according to claim 7, wherein the lumped components comprise at least one inductor and at least one capacitor arranged in at least one pi or T segment.

9. The transceiver switch circuitry according to claim 7, wherein the third transmitter quarter wavelength, $\lambda/4$, impedance transformer comprises an inductor ($L_1$) and a parasitic capacitance ($C_{main}$).

10. The transceiver switch circuitry according to claim 1, wherein the reception center frequency is equal to the transmission center frequency.

11. The transceiver switch circuitry according to claim 1, wherein the transceiver switch circuitry is adapted for differential operation.

12. A transceiver for wireless communication comprising:
    a transceiver switch circuitry being connectable to an antenna via an antenna port for transmitting transmission signals during transmission mode, and receiving reception signals during reception mode, the transceiver switch circuitry comprising:
    an antenna port connectable to an antenna circuitry;
    a receiver port connectable to a receiver circuitry;
    a first amplifier port connectable to a first amplifier circuitry;
    at least one second amplifier port connectable to at least one second amplifier circuitry;
    the transceiver switch circuitry being configured to be operable in a reception mode to allow reception signals at the antenna port to be forwarded to the receiver port, and configured to be operable in a transmission mode to allow transmission of transmission signals at the first amplifier port and the at least one second amplifier port to be forwarded to the antenna port for transmission, the transmission signals having a transmission center frequency with a wavelength, $\lambda$, and the reception signals having a reception center frequency within ten percent of the transmission center frequency;
    a receive arrangement connected between the antenna port and the receiver port, the receive arrangement comprising a receiver quarter wavelength, $\lambda/4$, impedance transformer and a receiver switch circuitry configured to ground the receiver quarter wavelength, $\lambda/4$, impedance transformer at the receiver port in the transmission mode;
    a transmit arrangement connected between the antenna port, the first amplifier port and the at least one second amplifier port, the transmit arrangement comprising a first, a second and a third transmitter quarter wavelength, $\lambda/4$, impedance transformer, the first transmitter quarter wavelength, $\lambda/4$, impedance transformer having a first side connected to the antenna port and a second side connected to a first side of the second transmitter quarter wavelength, λ/4, impedance transformer, and the third transmitter quarter wavelength, λ/4, impedance transformer having a first side connected to a second side of the second transmitter quarter wavelength, λ/4, impedance transformer and a second side connected to a DC supply voltage, $V_{dd}$;

the first amplifier port being connected via a first transmitter switch circuitry to the second side of the second transmitter quarter wavelength, λ/4, impedance transformer;

the at least one second amplifier port being connected via a second transmitter switch circuitry to the second side of the first transmitter quarter wavelength, λ/4, impedance transformer; and the first and second transmitter switch circuitry being configured to disconnect the first amplifier port and the at least one second amplifier port from the respective transmitter quarter wavelength, λ/4, impedance transformer in the reception mode;

a first amplifier connected to a first amplifier port of the transceiver switch circuitry and a second amplifier connected to a second amplifier port of the transceiver switch circuitry, the first amplifier and second amplifier being configured to generate transmission signals; and a receiver connected to a reception port of the transceiver switch circuitry and being configured to receive reception signals.

13. The transceiver according to claim 12, wherein the first amplifier and second amplifier is a Doherty amplifier.

14. The transceiver according to claim 12, wherein two transceiver switch circuitries are provided being arranged in a differential configuration.

15. A communication node (140) for a communication network comprising:

a transceiver, the transceiver comprising:
 a transceiver switch circuitry being connectable to an antenna via an antenna port for transmitting transmission signals during transmission mode, and receiving reception signals during reception mode, the transceiver switch circuitry comprising:
  an antenna port connectable to an antenna circuitry;
  a receiver port connectable to a receiver circuitry;
  a first amplifier port connectable to a first amplifier circuitry;
  at least one second amplifier port connectable to at least one second amplifier circuitry;
  the transceiver switch circuitry being configured to be operable in a reception mode to allow reception signals at the antenna port to be forwarded to the receiver port, and configured to be operable in a transmission mode to allow transmission of transmission signals at the first amplifier port and the at least one second amplifier port to be forwarded to the antenna port for transmission, the transmission signals having a transmission center frequency with a wavelength, λ, and the reception signals having a reception center frequency within ten percent of the transmission center frequency;
  a receive arrangement connected between the antenna port and the receiver port, the receive arrangement comprising a receiver quarter wavelength, λ/4, impedance transformer and a receiver switch circuitry configured to ground the receiver quarter wavelength, λ/4, impedance transformer at the receiver port in the transmission mode;
  a transmit arrangement connected between the antenna port, the first amplifier port and the at least one second amplifier port, the transmit arrangement comprising a first, a second and a third transmitter quarter wavelength, λ/4, impedance transformer, the first transmitter quarter wavelength, λ/4, impedance transformer having a first side connected to the antenna port and a second side connected to a first side of the second transmitter quarter wavelength, λ/4, impedance transformer, and the third transmitter quarter wavelength, λ/4, impedance transformer having a first side connected to a second side of the second transmitter quarter wavelength, λ/4, impedance transformer and a second side connected to a DC supply voltage, $V_{dd}$;
  the first amplifier port being connected via a first transmitter switch circuitry to the second side of the second transmitter quarter wavelength, λ/4, impedance transformer;
  the at least one second amplifier port being connected via a second transmitter switch circuitry to the second side of the first transmitter quarter wavelength, λ/4, impedance transformer; and
  the first and second transmitter switch circuitry being configured to disconnect the first amplifier port and the at least one second amplifier port from the respective transmitter quarter wavelength, λ/4, impedance transformer in the reception mode;
 a first amplifier connected to a first amplifier port of the transceiver switch circuitry and a second amplifier connected to a second amplifier port of the transceiver switch circuitry, the first amplifier and second amplifier being configured to generate transmission signals; and
 a receiver connected to a reception port of the transceiver switch circuitry and being configured to receive reception signals; and a communication arrangement connected to an antenna port of the transceiver.

16. The communication node according to claim 15, wherein the communication network is a wireless network and the communication arrangement is an antenna.

17. The communication node according to claim 16, wherein the communication node is a wireless device or a base station.

18. The transceiver switch circuitry according to claim 2, wherein the reception signals during reception mode only passes via the receiver quarter wavelength, λ/4, impedance transformer.

19. The transceiver switch circuitry according to claim 2, wherein the receiver quarter wavelength, λ/4, impedance transformer has an impedance that matches the impedance of the receiver circuitry to the antenna.

20. The transceiver switch circuitry according to claim 2, wherein the first transmitter quarter wavelength, λ/4, impedance transformer has an impedance that matches the transmitter impedance to the impedance of the antenna.

* * * * *